US009669732B2

(12) United States Patent
Cui et al.

(10) Patent No.: US 9,669,732 B2
(45) Date of Patent: Jun. 6, 2017

(54) TRACTION CONTROL SYSTEM FOR ELECTRIC MULTIPLE UNITS

(71) Applicant: CRRC QINGDAO SIFAND ROLLING STOCK RESEARCH INSTITUTE CO., LTD., Qingdao (CN)

(72) Inventors: Fengzhao Cui, Qingdao (CN); Yawei Zhang, Qingdao (CN); Guobin Sun, Qingdao (CN); Zhen Li, Qingdao (CN); Hu Cao, Qingdao (CN); Dawei Liang, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 0 days.

(21) Appl. No.: 15/322,066

(22) PCT Filed: May 20, 2015

(86) PCT No.: PCT/CN2015/079333
§ 371 (c)(1),
(2) Date: Dec. 23, 2016

(87) PCT Pub. No.: WO2016/123884
PCT Pub. Date: Aug. 11, 2016

(65) Prior Publication Data
US 2017/0129364 A1    May 11, 2017

(30) Foreign Application Priority Data
Feb. 5, 2015  (CN) .......................... 2015 1 0061014

(51) Int. Cl.
B60L 15/32      (2006.01)
H04L 29/08      (2006.01)
(Continued)

(52) U.S. Cl.
CPC ............. *B60L 15/32* (2013.01); *B60L 15/002* (2013.01); *G05B 19/0423* (2013.01);
(Continued)

(58) Field of Classification Search
CPC ................ B60L 15/32; G05B 19/0423; G05B 2219/21137; G06F 19/00
(Continued)

(56) References Cited

U.S. PATENT DOCUMENTS

2004/0227036 A1* 11/2004 Arita ........................ H04B 3/60
246/209
2011/0234134 A1   9/2011 Ramu ....................... 318/400.27
(Continued)

FOREIGN PATENT DOCUMENTS

CN      201252488 Y     6/2009
CN      201304990 Y     9/2009
(Continued)

OTHER PUBLICATIONS

International Search Report of corresponding International PCT Application No. PCT/CN2015/079333, dated Nov. 6, 2015.
(Continued)

*Primary Examiner* — Tan Q Nguyen
(74) *Attorney, Agent, or Firm* — J.C. Patents

(57) ABSTRACT

The present application relates to the electronic field of railways, and in particular to the traction control system for electric multiple units. A host processor of the traction control system for electric multiple units is connected to a subordinate computer board via a CPCI bus. The traction control system for electric multiple units comprises a fast computing board, a network module and a debugging module. An instruction is passed to the subordinate computer board via the CPCI bus, and meanwhile, the subordinate computer board passes status information to the host pro- (Continued)

cessor via the CPCI bus to realize overall control on the interior of the traction control system for electric multiple units. Bidirectional communication between the signal sampling board and the fast computing board is realized by a high-speed differential LinkPort bus to realize quick control on the inverter power module and the four-quadrant power module. Bidirectional communication between the network card and boards of the I/O module is realized by a CAN bus, and digital signals and analog signals sent by boards of the I/O module are transferred to the host processor via the CPCI bus to ensure stability and reliability in information transmission of the traction control system for electric multiple units.

7 Claims, 14 Drawing Sheets

(51) Int. Cl.
  *G05B 19/042* (2006.01)
  *B60L 15/00* (2006.01)
  *H02P 27/08* (2006.01)
  *G06F 19/00* (2011.01)
(52) U.S. Cl.
  CPC .............. *H02P 27/08* (2013.01); *H04L 67/12* (2013.01); *B60L 2200/26* (2013.01); *G05B 2219/21137* (2013.01); *G05B 2219/25127* (2013.01)

(58) Field of Classification Search
  USPC .............................. 701/22; 246/209; 710/313
  See application file for complete search history.

(56) References Cited

U.S. PATENT DOCUMENTS

2011/0248719 A1* 10/2011 Aoki .................... H01M 10/482
                                                                324/426
2015/0062112 A1*  3/2015 Umezaki ................ G11C 19/28
                                                                345/213

FOREIGN PATENT DOCUMENTS

| CN | 201901014 U | 7/2011 |
| CN | 102291068 A | 12/2011 |
| CN | 202261135 U | 5/2012 |
| CN | 203482100 U | 3/2014 |
| CN | 203580676 U | 5/2014 |
| WO | WO 2008/022814 A1 | 2/2008 |

OTHER PUBLICATIONS

Chinese First Examination Report of corresponding China patent Application No. 201510061014.9, dated Oct. 23, 2015.

* cited by examiner

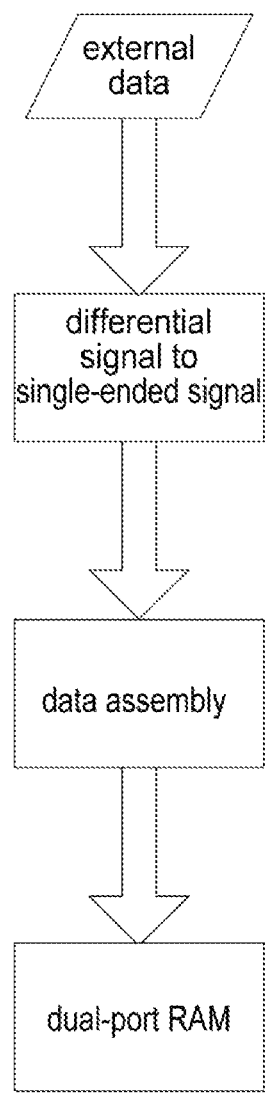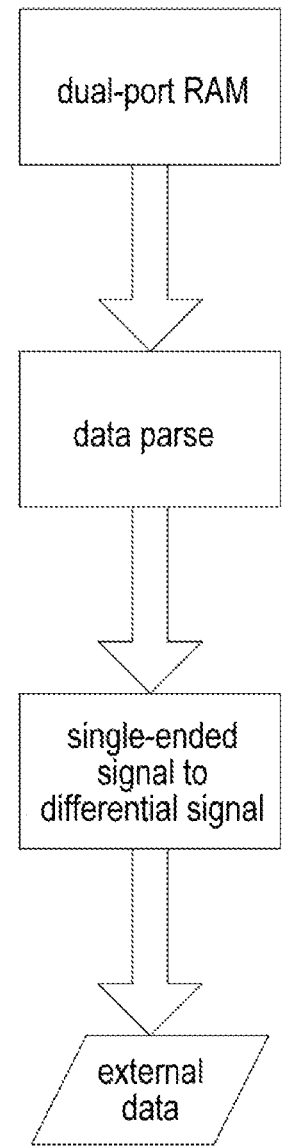
Fig. 6
Fig. 7

TRACTION CONTROL SYSTEM FOR ELECTRIC MULTIPLE UNITS

CROSS-REFERENCE TO RELATED APPLICATION

This application is a national phase application of international application No. PCT/CN2015/079333 filed on May 20, 2015, which in turn claims the priority benefits of Chinese application No. 201510061014.9 filed on Feb. 5, 2015. The contents of these prior applications are hereby incorporated by reference in its entirety.

TECHNICAL FIELD

The present application relates to the electronic field of railways, and in particular to a traction control system for electric multiple units.

BACKGROUND OF THE PRESENT INVENTION

A traction control system for electric multiple units is a key power controller of the electric multiple units. The traction control systems for electric multiple units control IGBT switches of four-quadrant rectifiers, brake choppers and traction inverters to provide control that meets requirements on the traction/brake performance of the electric multiple units.

A main circuit structure diagram of an existing traction control system for electric multiple units is shown in FIG. 1. Single-phase high-voltage current, received by a pantograph, is output to a four-quadrant unit via a secondary side of a transformer for rectification; and the rectified high-voltage direct current is output to an inverter power module through an intermediate DC bus. The high-voltage direct current, after being inverted by the inverter power module, is output to a traction motor to control the operation of the traction motor.

At present, control units of traction drive systems for electric multiple units are 32-bit host processors, for example, Siemens employs Elan SC520 with a dominant frequency of 133 MHz from AMD company; Bombardier employs MC68360 with a dominant frequency of 25 MHz from Freescale company; ALSTOM employs STPC with a dominant frequency of 133 MHz from ST company; and Zhuzhou Institute employs MPC5200D with a dominant frequency of 533 MHz.

In the aspect of selecting a control algorithm processor, Siemens employs DSP56002 with a dominant frequency of 100 MHz; Bombardier employs DSP56302 with a dominant frequency of 100 MHz; Alston employs ADI 21062 with a dominant frequency of 160 MHz; and Zhuzhou Institute employs TMS320C6713 with a dominant frequency of 200 MHz.

At present, processor chips used by various companies are relatively early products with relatively outdated chip models and a slow response system; many chips have been off the production line; in addition, since the chips have been off the production line, the manufacturing cost becomes consequently high.

SUMMARY OF THE PRESENT INVENTION

An objective of the present application is to provide a traction control system for electric multiple units, which can control both two groups of four-quadrant power modules and two groups of inverter power modules.

The present application employs the following technical solutions: a traction control system for electric multiple units is provided to control the operation of inverter/four-quadrant power modules of a traction converter for electric multiple units, mainly comprising: a power supply module, inverter/four-quadrant modules, an I/O module, a network module and a debugging module.

The inverter/four-quadrant modules each mainly consist of a fast computing board, a signal sampling board and a pulse interface board.

The signal sampling board is mainly configured to receive signals from an external sensor, pulse feedback signals sent by the pulse interface board and control signals sent by the fast computing board, and send pulse signals to the pulse interface board, processed acquisition signals to the fast computing board, and relay control signals to the I/O module.

The fast computing board is mainly configured to receive analog signals and digital signals acquired and processed by the signal sampling board and control signals sent by a host processor, and send control signals to the signal sampling board and processing signals to the network module.

A traction control unit can control two groups of inverter power modules and two groups of four-quadrant power modules by the pulse interface board; and the pulse interface board is mainly configured to receive IGBT status signals sent by the inverter/four-quadrant power modules and IGBT control signals sent by the signal sampling board, and send the IGBT status signals to the signal sampling board and the IGBT control signals to the inverter/four-quadrant power modules.

Bidirectional communication between the signal sampling board and the fast computing board is realized by a high-speed differential LinkPort bus;

bidirectional communication between the signal sampling board and the I/O module is realized by a high-speed bus;

bidirectional communication between the fast computing board and the host processor, between the network module and the host processor, and between the debugging module and the host processor are realized by a CPCI bus;

bidirectional communication between the I/O module and the inverter/four-quadrant modules is realized by a high-speed bus; and bidirectional communication between the I/O module and the network module, between the I/O module and the debugging module are realized by a CAN bus.

The network module comprises a network board. The network module receives digital signals and analog signals sent by the I/O module and transfers the digital signals and the analog signals to the host processor via the CPCI bus; receives command signals from the host processor via the CPCI bus, and sends commands to the I/O module to control the I/O module to output analog signals and analog signals; controls data interaction between an MVB interface unit and an external MVB bus; and sends MVB data to the host processor via the CPCI bus, and sends data to be sent by the host processor to the MVB interface unit via the CPCI bus.

The debugging module comprises a debugging board; the debugging module receives debugging commands and debugging signals sent by the host processor via the CPCI bus; the debugging module receives debugging signals sent by the signal sampling board via a high-speed bus; and the debugging module outputs analog debugging signals by a 32-path analog output circuit.

The power supply module supplies power to the inverter/four-quadrant modules, the I/O module, the network module and the debugging module; meanwhile, the power supply module supplies power to inverter/four-quadrant power modules; and meanwhile, the power supply module supplies power to an internal sensor of the traction converter.

Further, due to the presence of both current and voltage in signals acquired by the sensor, the signal sampling board comprises a current/voltage acquisition unit and a clock management unit; and the current/voltage acquisition unit consists of a signal conditioning circuit and an ADC sampling circuit, which are connected to each other; and the current/voltage acquisition unit has multiple paths, all of which are connected to the signal sampling board; the clock management unit is connected to the signal sampling board and the fast computing board, respectively; the signal conditioning circuit comprises a first resistor, a second resistor, a filter capacitor, and an operational amplifier; an input terminal of the signal conditioning circuit is connected to a sampling sensor terminal; the input terminal of the signal conditioning circuit is connected to a first terminal of the first resistor; a second terminal of the first resistor is connected to a first terminal of the second resistor and a positive input terminal of the operational amplifier, respectively; a second terminal of the second resistor is grounded; a reverse input terminal of the operational amplifier is connected to a reference voltage terminal; an output terminal of the operational amplifier is connected to the ADC sampling circuit; and the input terminal of the signal conditioning circuit is grounded via the filter capacitor.

Further, the pulse interface board can achieve the function of photoelectric conversion; the pulse interface board comprises a PWM level conversion circuit, an optical-to-electric conversion unit, an electric-to-optical conversion unit, and a backplane interface unit; the PWM level conversion circuit is connected to the signal sampling board by the backplane interface unit; and the pulse interface board can further comprise a self-diagnosis unit;

the self-diagnosis unit comprises an input diagnosis unit and an output diagnosis unit;

there are multiple groups of optical-to-electric conversion units and electric-to-optical conversion units; the optical-to-electric conversion units each comprise a multiplexer, buffers and an optical-to-electric conversion circuit, the backplane interface unit is connected to the multiplexer by a buffer I, and the multiplexer is connected to the optical-to-electric conversion circuit by a buffer II; and the electric-to-optical conversion unit comprises a multiplexer, buffers, and an electric-to-optical conversion circuit, the electric-to-optical conversion circuit is connected to the multiplexer by a buffer III, and the multiplexer is connected to the backplane interface unit by a buffer IV; and the output diagnosis unit comprises a multiplexer and an output self-diagnosis circuit, output terminals of the buffers II of each group of optical-to-electric conversion units are connected to an input terminal of the multiplexer of the output self-diagnosis unit, an input terminal of the output self-diagnosis circuit is connected to an output terminal of the buffer II, and an output terminal of the multiplexer is connected to the backplane interface unit; and the input diagnosis unit comprises a multiplexer and an input self-diagnosis circuit, an input terminal of the multiplexer is connected to the backplane interface unit, and an output terminal of the multiplexer is divided into multiple paths which are connected to the input terminals of the buffers III of each group of electric-to-optical conversion units, respectively.

In order to achieve direct communication between the host processor CPU device and the MVB device on the control board via an ISA bus interface, a protocol convertor between a CPCI bus and an ISA bus is designed between the network module and the host processor for bidirectional communication; the protocol converter comprises a CPCI local bus interface extension timing module, an ISA bus interface timing module, a CPCI bus matching ISA bus timing interface module, and a clock management module; and the CPCI local bus interface extension timing module communicates with the local CPCI bus by an address/data signal AD [31:0], a command/byte enable signal C/BE [3:0], a slave device get-ready signal TRDY, a data transfer stop signal STOP, a frame period signal FRAME and a master device get-ready signal IRDY; the ISA bus interface timing module communicates with the CPCI local bus interface extension timing module by a data enable signal S_DATA_VLD, an address enable signal ADDR_VLD, a read enable signal barx_rd, a write enable signal barx_wr, a byte enable signal S_CBE, a data signal D [31:0] and an address signal A [31:0]; the ISA bus interface timing module communicates with the local ISA bus by a data signal SD, an address signal SA, a read/write IO device signal IOW/IOR, a read/write MEMORY device signal MEMR/MEMW, an address latch signal BALE; the CPCI bus matching ISA bus timing interface module communicates with the CPCI local bus interface extension timing module by an interruption and reconnection signal USER_STOP; and the clock management module provides an operation clock for the CPCI local bus interface extension timing module, the ISA bus interface timing module and the CPCI bus matching ISA bus timing interface module.

Compared with a standard traction control frame, a main case of the traction control system for electric multiple units is a reinforced high-strength case, and case panels on two sides of the reinforced case are reinforced panels.

Double plug-in units are provided at the junctions between boards of the traction control system for electric multiple units and a main case board slot; the double plug-in units each mainly consist of a base plate, pins and a switching board; an upper portion of the base plate is connected to the switching board; the switching board is an L-shaped board, and a bottom left portion of the L-shaped board is hinged with the base plate at a hinge portion and can rotate by a certain angle along the hinge portion; a positioning groove for the switching board is provided on the base plate, and the positioning groove is matched with a lower portion of the L-shaped board; two rows of pins are fixed at a lower portion of the base plate, and the pins are used to connect the board slot; and a bolt hole fixed with the board is provided on one side of the base plate.

Compared with the prior art, the present application has the following advantageous effects.

(1) A host processor of the traction control system for the electric multiple units is connected to a lower computer board by a CPCI bus, and the traction control system comprises a fast computing board, a network module and a debugging module; an instruction is passed on to the lower computer board by the CPCI bus, and meanwhile, the lower computer board passes status information to the host processor by the CPCI bus to achieve an overall control on the inside of the traction control system for electric multiple units.

(2) Bidirectional communication between the signal sampling board and the fast computing board is realized by a high-speed differential LinkPort bus to achieve a quick control on the inverter power module and the four-quadrant power module.

(3) Two-way communication between the network card and each board of the I/O module is realized by a CAN bus, and the digital and analog signals sent by each boards of the I/O module are transferred to the host processor by the CPCI bus to ensure stability and reliability in information transmission of the traction control system for electric multiple units.

(4) The common data communication protocol is CAN and the like. Compared with LinkPort, these protocols are low in the rate of data acquisition and transfer. With regard to the present application, LinkPort transfer between the signal sampling board and the fast computing board is achieved. LinkPort, a kind of low voltage differential signal (LVDS), boasts excellent properties such as being high in speed, extremely low in power consumption, noise and cost. Data transfer via LinkPort, to a great extent, improves speed of data transfer, which can reach 400 Mbit/s. In this way, a quick control on the traction control unit can be realized.

(5) The traction control system for electric multiple units employs mainstream control chips and advanced design mentalities, and also employs a QNX embedded and real-time operation system. The operation system has a low occupancy rate of system resources, and is highly professional, thus being applicable for special fields. The system, being concise, high in safety level, instantaneity and efficient in code execution, can support multiple tasks.

(6) The case structure of the traction control system for electric multiple units is improved. A main case of the traction control system for electric multiple units is a reinforced high-strength case. Double plug-in units are provided at the conjunctions between all kinds of boards and a main case board slot.

BRIEF DESCRIPTION OF THE DRAWINGS

FIG. 6 is a flowchart of receiving data by LinkPort of the signal sampling board;

FIG. 7 is a flowchart of sending data by LinkPort of the signal sampling board;

DETAILED DESCRIPTION OF THE PRESENT INVENTION

In order to make the objectives, technical solutions and advantages of the embodiments of the present application more clear, the technical solutions in the embodiments of the present application will be described clearly and completely with reference to the accompanying drawings in the embodiments of the present application. Obviously, the embodiments described are merely some but not all of the embodiments of the present application. On the basis of the embodiments of the present application, all other embodiments obtained by those skilled in the art without paying any creative effort shall fall into the protection scope of the present application.

Embodiment 1

Figure 2:
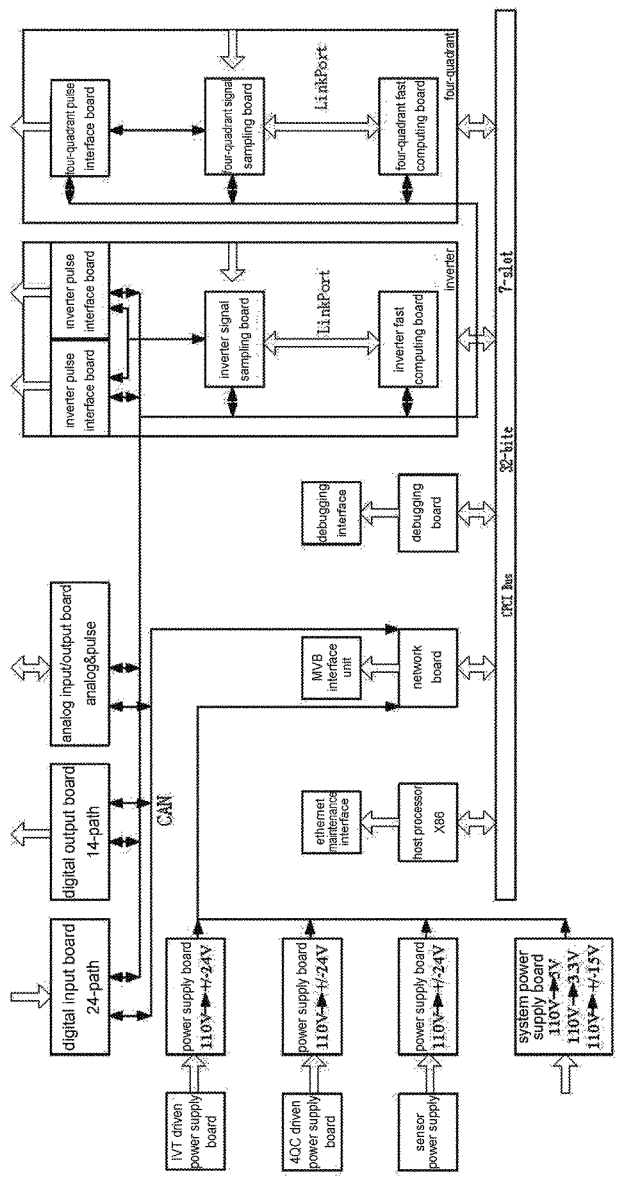
FIG. 2 is a structure diagram of a traction control system for electric multiple units of the present application.

A traction control system for electric multiple units is provided, which can control two groups of four-quadrant power modules and two groups of inverter power modules at the same time. With reference to FIG. 2, the traction control system for electric multiple units mainly comprises: a power supply module, an inverter/four-quadrant module, an I/O module, a network module and a debugging module.

The power supply module consists of a plurality of power supply boards, comprising a 110 V→24 V power supply board, a 110 V→5 V power supply board, a 110 V→3.3 V power supply board and a 110 V→15 V power supply board. The main function of the power supply module is to supply power to the inverter/four-quadrant module, the I/O module, the network module and the debugging module, supply power to inverter/four-quadrant power modules, and supply power to an internal sensor of the traction converter.

The I/O module provides an external I/O control, mainly used for status collection and control output. The I/O module mainly comprises a digital input board, a digital output board, and an analog input/output board. Bidirectional communication between the I/O module and the inverter/four quadrant module is realized by a high-speed bus; and bidirectional communication between the I/O module, and the network module and the debugging module are realized by a CAN bus.

The function of the inverter/four quadrant module is to achieve control on the traction converter and on the four quadrants, mainly consisting of a fast computing board, a signal sampling board and a pulse interface board. The fast computing board comprises an inverter fast computing board and a four-quadrant fast computing board. The signal sampling board comprises an inverter signal sampling board and a four-quadrant signal sampling board. The pulse interface board comprises an inverter pulse interface board and a four-quadrant pulse interface board.

The inverter signal sampling board is mainly configured to receive signals from an external sensor, pulse feedback signals sent by the inverter pulse interface board and control signals sent by the inverter fast computing board, and send pulse signals to the inverter pulse interface board, processed acquisition signals to the inverter fast computing board, and relay control signals to the I/O module.

The inverter fast computing board is mainly configured to receive analog signals and digital signals acquired and processed by the inverter signal sampling board and control signals sent by a host processor, and send control signals to the inverter signal sampling board and processing signals to the network module.

The inverter pulse interface board is connected to a maximum of two groups of inverter power modules.

The inverter pulse interface board is mainly configured to receive IGBT status signals sent by the inverter power module and IGBT control signals sent by the inverter signal sampling board, and send the IGBT status signals to the inverter signal sampling board and the IGBT control signals to the inverter power modules.

Bidirectional communication between the inverter signal sampling board and the inverter fast computing board is realized by a high-speed differential LinkPort bus; the bidirectional communication between the inverter signal sampling board and the I/O module is realized by a high-speed bus; and bidirectional communication between the inverter fast computing board, and the network module and the debugging module are realized by a CPCI bus.

The four-quadrant signal sampling board is mainly configured to receive signals from an external sensor, pulse feedback signals sent by the four-quadrant pulse interface board and control signals sent by the four-quadrant fast computing board, and send pulse signals to the four-quadrant pulse interface board, processed acquisition signals to the four-quadrant fast computing board and relay control signals to the I/O module.

The four-quadrant fast computing board is mainly configured to receive analog signals and digital signals acquired and processed by the four-quadrant signal sampling board and control signals sent by a host processor, and send control signals to the four-quadrant signal sampling board and processing signals to the network module.

The four-quadrant pulse interface board is connected to a maximum of two groups of four-quadrant power modules;

The four-quadrant pulse interface board is mainly configured to receive IGBT status signals sent by the four-quadrant power module and IGBT control signals sent by the four-quadrant signal sampling board, and send the IGBT status signals to the four-quadrant signal sampling board and the IGBT control signals to the four-quadrant power modules.

Bidirectional communication between the four-quadrant signal sampling board and the four-quadrant fast computing board is realized by a high-speed differential LinkPort bus; bidirectional communication between the four-quadrant signal sampling board and the I/O module is realized by a high-speed bus; and bidirectional communication between the four-quadrant fast computing board, and the network module and the debugging module are realized by a CPCI bus.

The network module comprises a network board. The network module receives digital signals and analog signals sent by the I/O module and transfers the digital signals and the analog signals to the host processor via the CPCI bus; receives command signals from the host processor via the CPCI bus, and sends a command to the I/O module to control the I/O module to output the analog signals and the analog signals; controls data interaction between an MVB interface unit and an external MVB bus; and sends MVB data to the host processor via the CPCI bus, and sends data to be sent by the host processor to the MVB interface unit via the CPCI bus.

The debugging module is mainly configured to perform a real-time debugging process in coordination with other boards in the network. The debugging module comprises a debugging board; the debugging module receives debugging commands and debugging signals sent by the host processor via the CPCI bus; the debugging module receives debugging signals sent by the signal sampling board via a high-speed bus; and the debugging module outputs analog debugging signals via a 32-path analog output circuit.

Figure 3:
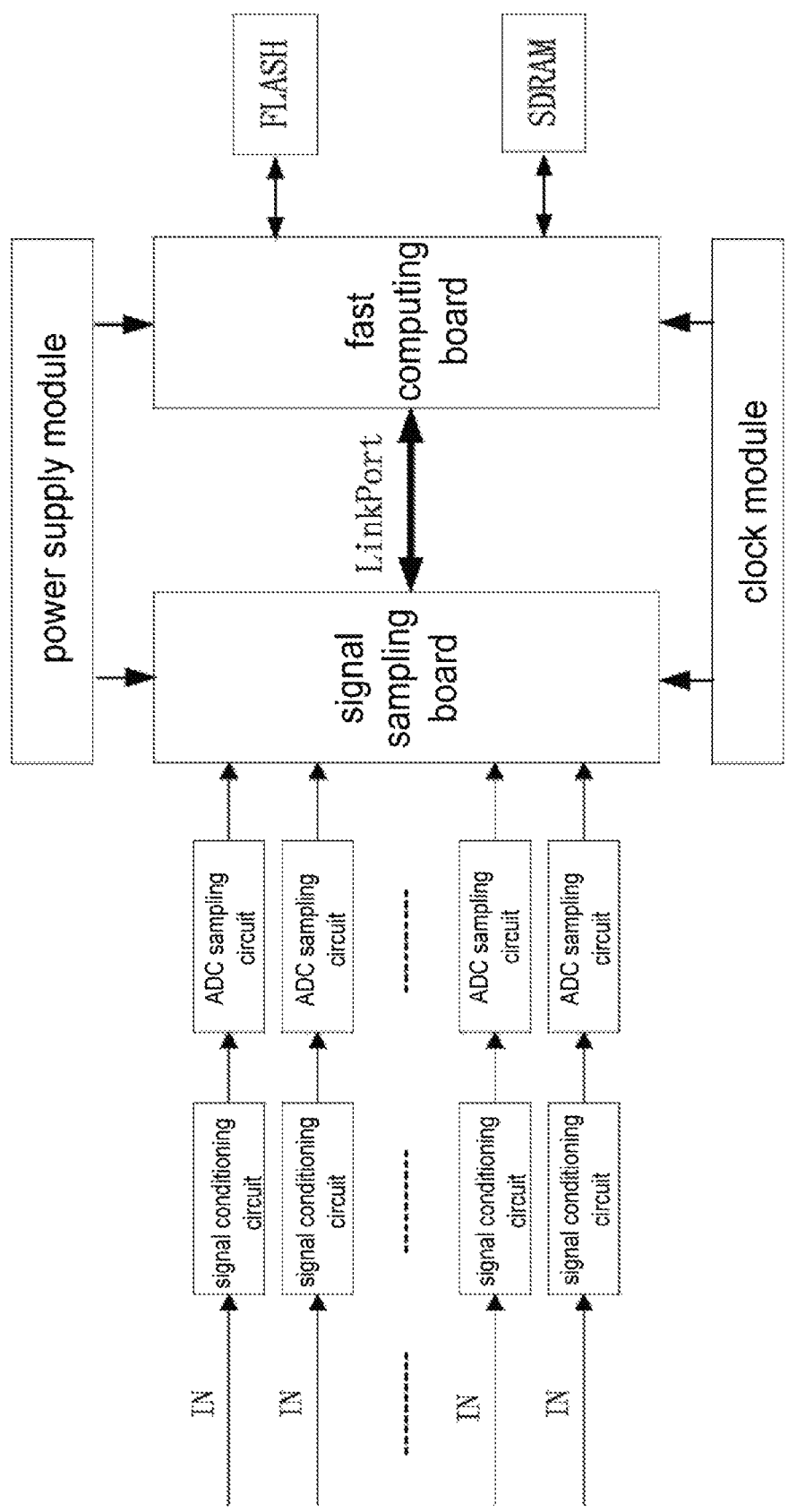
FIG. 3 is a schematic structure diagram of a signal sampling board and a fast computing board.

As shown in FIG. 3, the purpose of the traction control system is to control an IGBT switch inside the converter to realize conversion from AC to DC, and again a conversion from DC to AC. During operation, a sensor on the circuits acquires current signals and voltage signals of circuits of the traction converter, feeds back the signals to the fast computing board via the signal sampling board, analyzes and computes the signals and provides a control signal in consideration of the computing results. Since the sampling signals comprise current signals and voltage signals, a current and voltage reuse acquisition unit is designed in the present application. Wherein, the signal sampling board comprises a current/voltage acquisition unit and a clock management unit. The current/voltage acquisition unit consists of a signal conditioning circuit and an ADC sampling circuit, which are connected to each other.

Figure 4:
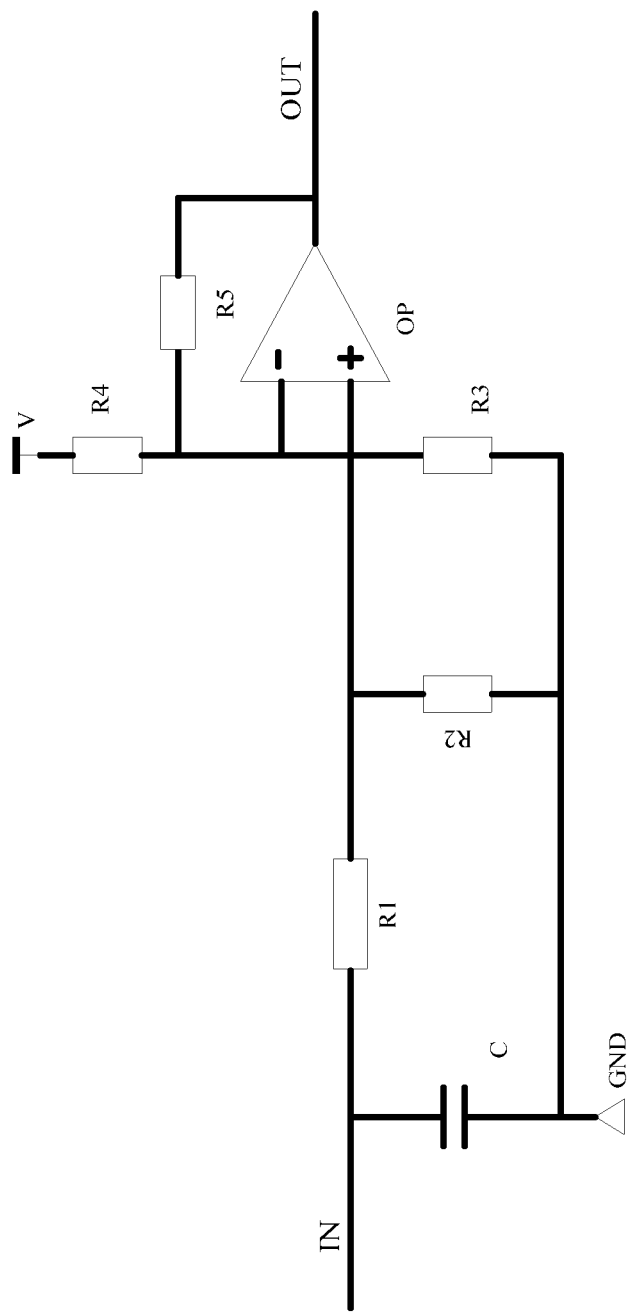
FIG. 4 is a schematic structure diagram of a signal conditioning circuit of the signal sampling board.

The current/voltage acquisition unit has multiple paths, all of which are connected to the signal sampling board; and the clock management unit is connected to the signal sampling board and the fast computing board, respectively. FIG. 4 is a schematic structure diagram of the signal conditioning circuit. The signal conditioning circuit comprises a first resistor R1, a second resistor R2, a filter capacitor C, and an operational amplifier OP; an input terminal IN of the signal conditioning circuit is connected to a signal acquisition terminal; the input terminal IN of the signal conditioning circuit is connected to a first terminal of the first resistor R1; a second terminal of the first resistor R1 is connected to a first terminal of the second resistor R2 and a positive input terminal of the operational amplifier OP, respectively; a second terminal of the second resistor R2 is grounded; a reverse input terminal of the operational amplifier OP is connected to a reference voltage terminal V; an output terminal OUT of the operational amplifier is connected to the ADC sampling circuit; and the input terminal IN of the signal conditioning circuit is grounded via the filter capacitor C.

A signal acquisition terminal of the signal conditioning circuit is a voltage signal acquisition terminal or a current signal acquisition terminal to acquire data such as network voltage, network current, inverter current and other data on a train. When the input terminal of the signal conditioning circuit is connected to a voltage signal acquisition terminal, both of the first resistor R1 and the second resistor R2 are precise resistors of low power and high resistance. When the input terminal of the signal conditioning circuit is connected to the current signal acquisition terminal, the first resistor R1 is a current-limiting resistor of high power and low resistance, and the second resistor R2 is a sampling resistor of high power and low resistance. Finally, with the use of the operational amplifier OP, by flexibly designing an amplification coefficient of a proportional operational amplifier circuit by the configuration of the resistors R3, R4 and R5, the purpose of measuring an input current or voltage of any size is achieved.

The signal conditioning circuit acquires a current signal or a voltage signal. The sampled signal is subjected to analogto-digital conversion by the ADC sampling circuit. After the conversion, data will be transferred to the signal sampling board.

The signal sampling board sends the data to the fast computing board via the LinkPort for data processing; and the fast computing board transfers the processed data to the signal sampling board side via the LinkPort.

Figure 5:
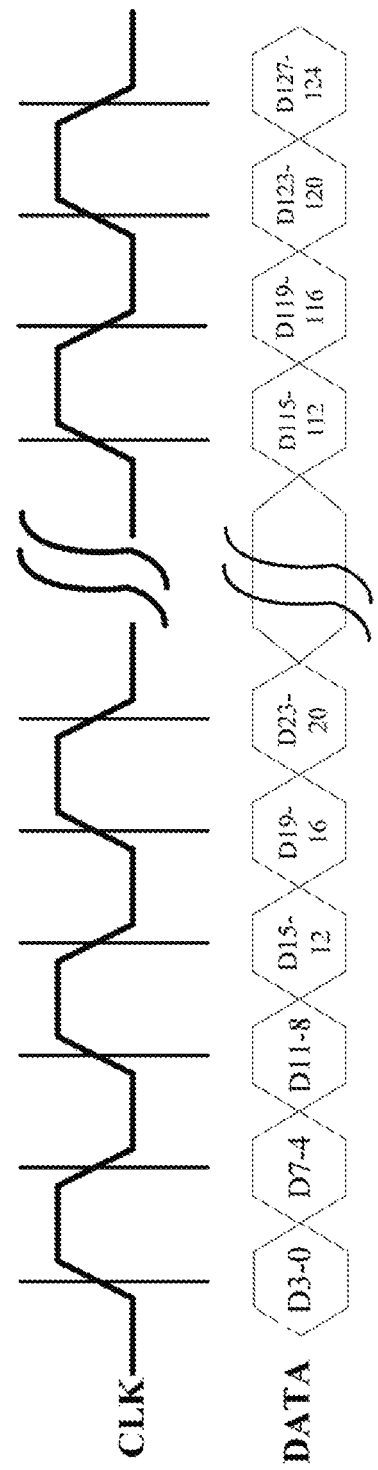
FIG. 5 is a schematic view of LinkPort communication.

FIG. 5 provides a schematic view of LinkPort communication. It can be seen from FIG. 5 that LinkPort communication requires data acquisition and sending to be executed by a chip unit on both of a rising edge and a falling edge of the clock, and data acquired and sent at each time is a 4-bit differential signal. The principle of sending and receiving LinkPorts of the signal sampling board of the present application is as follows: data is received and sent by the signal sampling board at both of the rising edge and the falling edge of the clock.

FIG. 6 and FIG. 7 respectively provide the flowchart of receiving data by the LinkPort of the signal sampling board and the flowchart of sending data by the LinkPort of the signal sampling board. Data is received and sent by an FPGA inside the signal sampling board. A DSP on the fast computing board is a unit performing data interaction and data computation with the FPGA. FPGA has a dual-port RAM. In the process of sending data to the DSP by the FPGA via the LinkPort, a data storage line of the dual-port RAM serves as an FPGA data processing module; and a data-to-be-accessed data line serves as a LinkPort communication module. It can be seen from FIG. 7 that the FPGA sends data to the DSP via the LinkPort as follows:

(a) sending, by the FPGA, a sampling signal received from the ADC sampling circuit to the data storage line of the dual-port RAM, i.e., the FPGA data processing module;

(b) packaging, by the FPGA, data with 4 bits of adjacent single-ended signals in a group from the data-to-be-accessed data line of the dual-port RAM, i.e., from the LinkPort communication module;

(c) converting, by the FPGA, the packaged data from a single-ended signal to a differential signal;

(d) giving, by the FPGA, a data transmission signal at the rising edge and the falling edge of the clock, and sending the converted data to the DSP.

In the process of receiving data by the FPGA from the DSP via the LinkPort, the data storage line of the dual-port RAM serves as a LinkPort communication module, and the data-to-be-accessed data line serves as the FPGA data processing module. It can be seen from the FIG. 6 that the FPGA receives data from the DSP via the LinkPort as follows:

(e) receiving, by the FPGA, data sent by the DSP at the rising edge and the falling edge of the clock, respectively;

(f) converting, by the FPGA, the received data from a differential signal to a single-ended signal;

(g) performing, by the FPGA, data parse on the converted data to parse the data packaged with 4 bits in a group into unit data;

(h) sending, by the FPGA, the parsed data to the data storage line of the dual-port RAM, i.e., the LinkPort communication module; and (i) accessing, by the FPGA, the data from the data-to-be-accessed data line of the dual-port RAM, i.e., the FPGA data processing module, and putting the data into practice.

The pulse interface board mainly achieves the function of signal transfer in the traction control system. The pulse interface board is configured to receive IGBT status signals sent by the inverter/four-quadrant power modules of the traction converter and IGBT control signals from the signal sampling board to the inverter/four-quadrant power modules of the traction converter, and send the IGBT status signals of the inverter/four-quadrant power modules of the traction converter to the signal sampling board and the IGBT control signals to the inverter/four-quadrant power modules of the traction converter.

Figure 8:
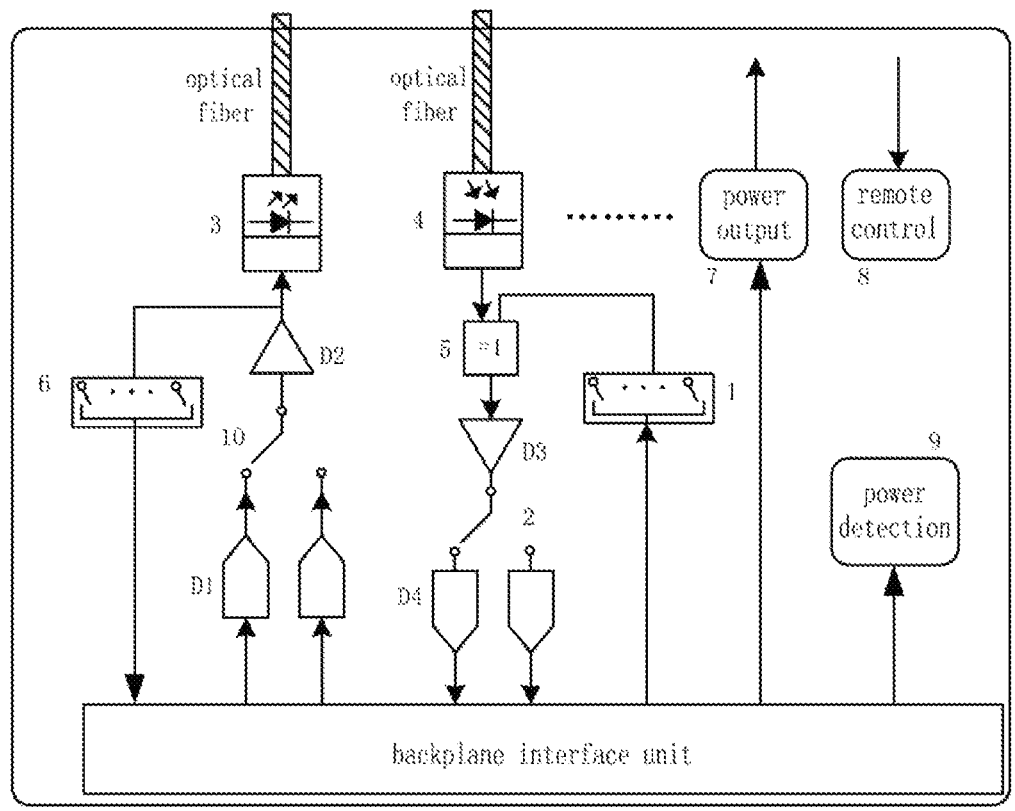
FIG. 8 is a schematic structure diagram of a pulse interface board.
Figure 9:
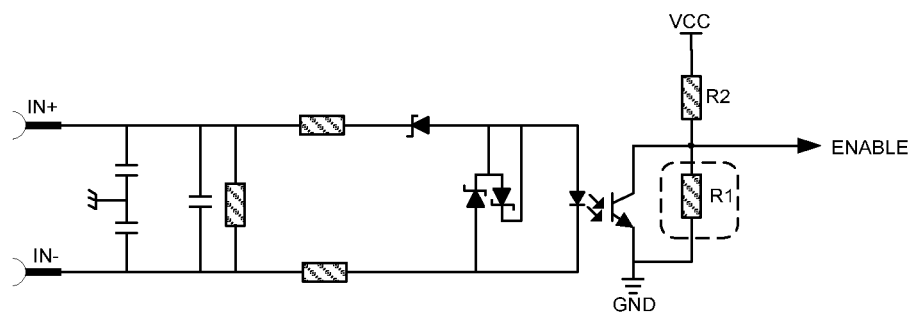
FIG. 9 is a schematic structure diagram of a remote control unit circuit of the pulse interface board.

Upon receiving a computing control signal from the fast computing board, the signal sampling board transfers the computing control signal to the pulse interface board. What is received by the pulse interface board is an electrical signal. In order to avoid interference from strong electricity and the complicated electromagnetic surroundings on an IGBT driving signal, the pulse interface board is designed as a photoelectric conversion board. As shown in FIG. 8, the pulse interface board has the following structure.

Figure 1:
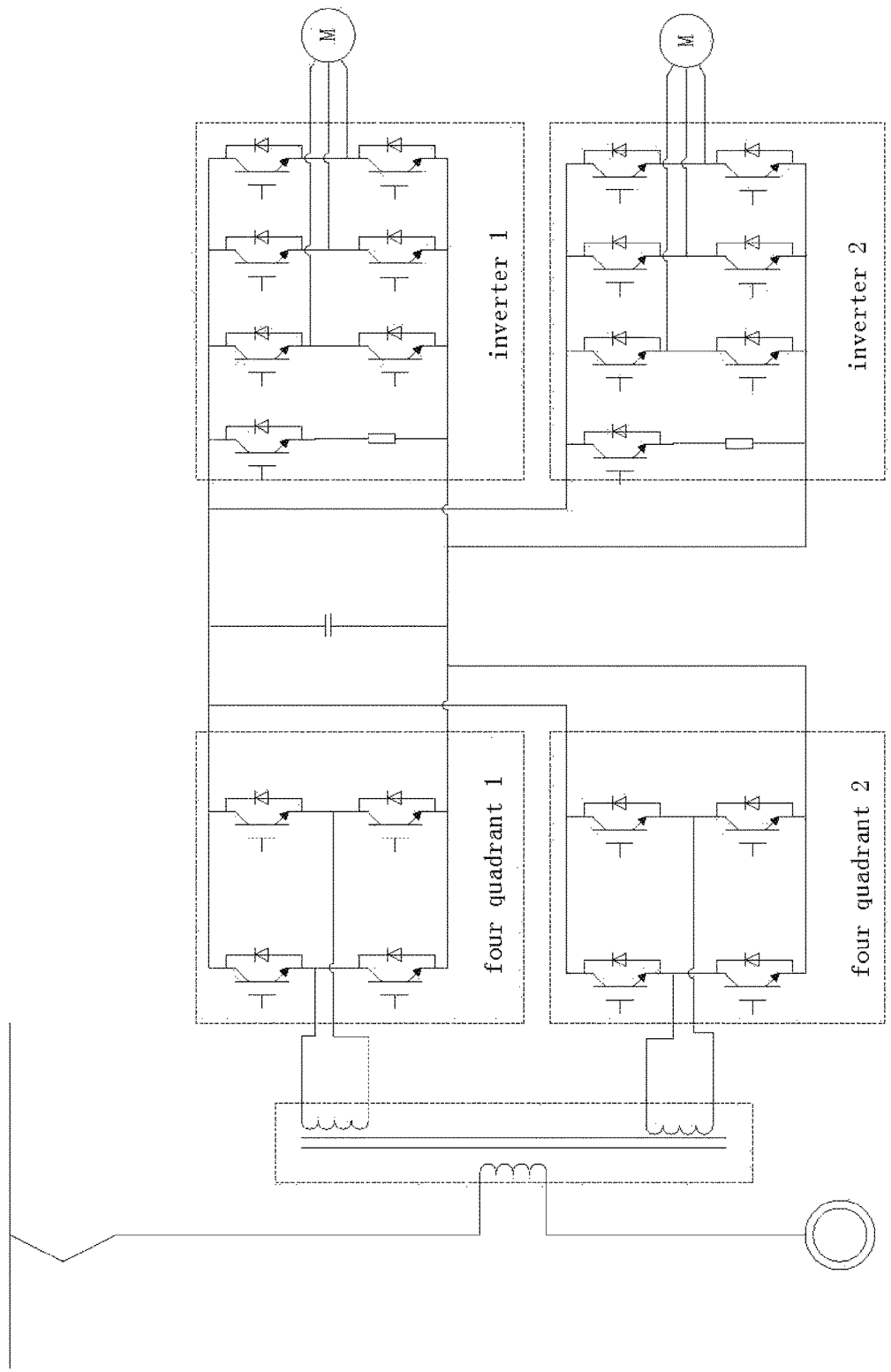
FIG. 1 is a main circuit structure diagram of an prior traction control system for electric multiple units.

The pulse interface board comprises a PWM level conversion circuit, an optical-to-electric conversion unit, an electric-to-optical conversion unit, and a backplane interface unit; and the PWM level conversion circuit is connected to the backplane interface unit. The pulse interface board further comprises a self-diagnosis unit. The self-diagnosis unit comprises an input diagnosis unit and an output diagnosis unit. In the drawing provided in FIG. 1 of this embodiment, a group of optical-to-electric conversion units and a group of electric-to-optical conversion units are shown. Since the backplane interface unit is expandable, there are multiple groups of both optical-to-electric conversion units and electric-to-optical conversion units. The optical-to-electric conversion units each comprise a multiplexer 10, buffers and an optical-to-electric conversion circuit 3, the backplane interface unit is connected to the multiplexer 10 via a buffer D1, and the multiplexer 10 is connected to the optical-to-electric conversion circuit 3 via a buffer D2; and an output terminal of the optical-to-electric conversion circuit is connected to a driving module of the traction control unit for trains. The electric-to-optical conversion units each comprise a multiplexer 2, buffers and an electric-to-optical conversion circuit 4. An input terminal of the electric-to-optical conversion circuit 4 is connected to the driving module of the traction control unit for a train, an output terminal of the electric-to-optical conversion circuit 4 is connected to the multiplexer 2 via a buffer D3, and the multiplexer 2 is connected to the backplane interface unit via a buffer D4. The output diagnosis unit comprises a multiplexer and an output self-diagnosis circuit, output terminals of the buffers D2 of each group of optical-to-electric conversion units are connected to an input terminal of the multiplexer 6 of the output self-diagnosis unit, the input terminal of the output self-diagnosis circuit is connected to an output terminal of the buffer D2, and an output terminal of the multiplexer 6 is connected to the backplane interface unit. The input diagnosis unit comprises a multiplexer 1 and an input self-diagnosis circuit, the input terminal of the multiplexer 1 is connected to the backplane interface unit; and the output terminal of the multiplexer 1 is divided into multiple paths which are connected to the input terminals of the buffers D3 of each group of electric-to-optical conversion units, respectively.

Figure 10:
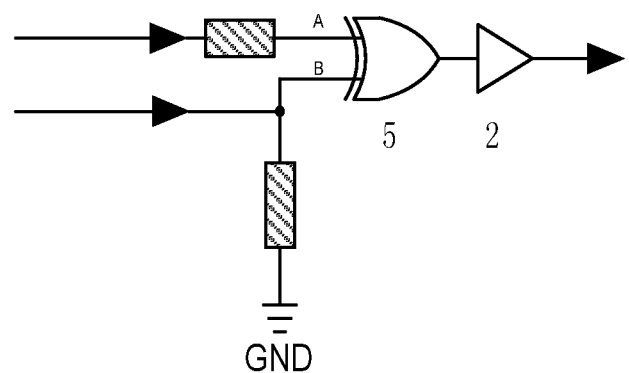
FIG. 10 is a schematic structure diagram of an input self-diagnosis circuit of the pulse interface board.
Figure 11:
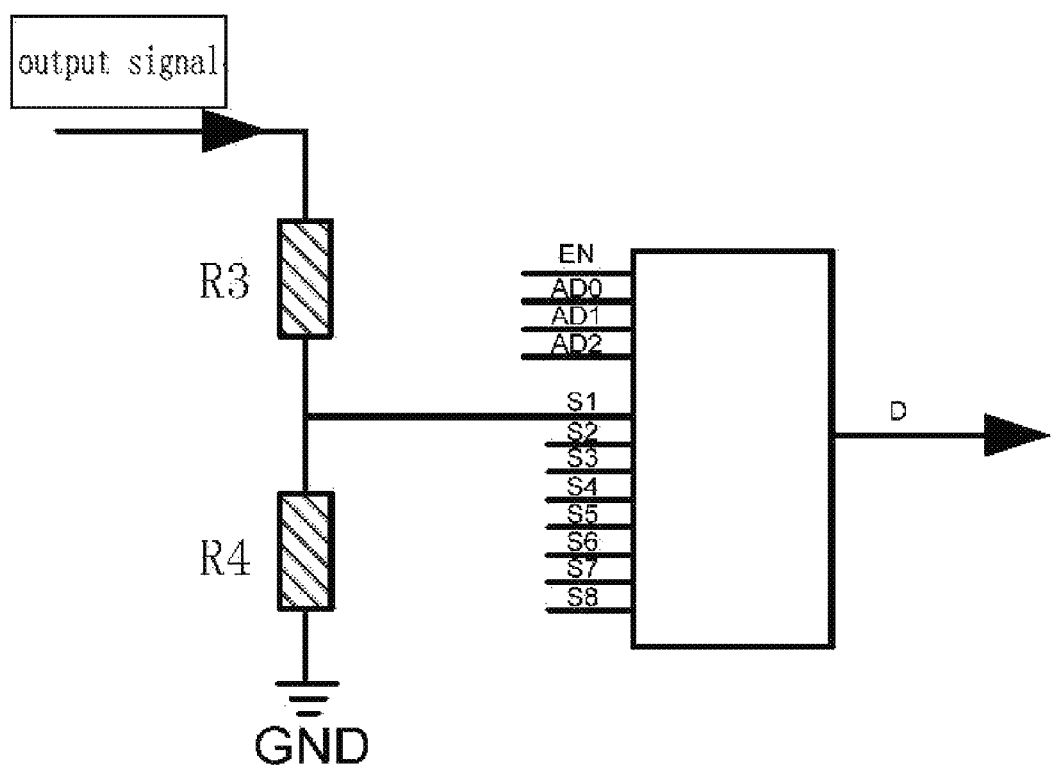
FIG. 11 is a schematic structure diagram of an output self-diagnosis circuit of the pulse interface board.

FIG. 10 and FIG. 11 respectively provide schematic structure diagrams of the input self-diagnosis circuit and the output self-diagnosis circuit.

As shown in FIG. 10, the input self-diagnosis circuit comprises an input terminal and a test signal terminal. The test signal terminal receives test signals from the multiplexer 1; the input terminal is connected to an output terminal of the electric-to-optical conversion module; the test signals and two signals of the input terminal serve as an input of the buffer D3 after passing through an exclusive-OR gate 5. Each path of electric-to-optical conversion unit has an independent self-diagnosis circuit, all the test signal terminals of which are connected to the multiplexer 1.

As shown in FIG. 11, an output signal terminal of the output self-diagnosis circuit is connected to an output terminal of the buffer D2; all the output terminals of the buffers D2 of each path of optical-to-electric conversion unit are connected to an independent output diagnosis circuit, and the output terminals of each path of output diagnosis circuit are connected to the multiplexer 6.

Since a traction driving unit for a train generally requires independent external power supply, a power output circuit is designed in the pulse interface board, for convenience. An input terminal of a power output unit 7 is connected to the backplane interface unit, with an input voltage coming from the backplane supply voltage, and an output terminal thereof is connected to the traction driving unit. The power output circuit in this embodiment has 4 output paths by which a voltage of 15V can be output to be used by the traction driving unit. A power detection circuit 9 is also provided to detect the status of the backplane power supply.

The pulse interface board also comprises a remote control unit 8, an output terminal of which is connected to an ENABLE terminal of multiplexer on the optical-to-electric conversion unit and that on the electric-to-optical conversion unit. FIG. 2 provides a schematic structure diagram of one embodiment of the remote control unit 8. A remote control circuit comprises a remote input terminal and a board output terminal. An ENABLE terminal in the drawing is connected to the ENABLE terminal of the multiplexer, and the multiplexer is a low level enable. Whether a remote control is performed can be decided as needed. When the remote control unit 8 is required, the resistor R1 is not connected to the circuit; a 24V voltage optocoupler is applied between the remote input terminal IN+ and the remote input terminal IN−; the circuit is turned on; the remote input terminal is connected to the board output terminal via the optocoupler; an emitter of the optocoupler is connected to the ground, and a collector of the optocoupler is connected to the power supply via the resistor R2; an output terminal of R2 is an ENABLE terminal; low level is output; and thus, the function of remote controlling of the operation of the photoelectric boards is realized. When the remote control unit 8 is not required to operate, voltage input between the remote input terminal IN+ and the remote input terminal IN− is cut off, and the board output terminal of the remote control unit operates. R1 is connected to the circuit; an input terminal of R1 is connected to R2, and an output terminal thereof is grounded; and the ENABLE terminal outputs a low level constantly.

A status indication circuit can also be provided for the pulse interface board as needed to indicate the operation status of the board explicitly. A status indication unit comprises an output status indication unit and an input status indication unit. An input terminal of the output status indication unit is connected to an input terminal of the optical-to-electric conversion circuit. The input terminal of the input status indication circuit is connected to an output terminal of the electric-to-optical conversion circuit. The status indication unit consists of a plurality of LED lamps, and each path of LED lamp is connected to an output terminal of a corresponding multiplexer.

The backplane interface unit receives an electrical signal from the signal sampling board. A TTL signal of 3.3 V is converted into a TTL signal of 5 V via the PWM level conversion circuit and the TTL signal of 5 V is transmitted to the optical-from-electric conversion circuit. The electrical signal is converted into an optical signal which is transmitted to the traction driving unit for a train via an optical fiber. The electrical signal from the traction driving unit is converted to an optical signal from an electrical signal via the electric-to-optical conversion unit and fed back to the signal sampling board. During operation, a path is selected by a multiplexer 10 and a multiplexer 2 respectively for signals. A certain path of optical-to-electric conversion unit or electric-to-optical conversion unit is selected for self-diagnosis by the multiplexer 6 and the multiplexer 10.

A main case of the traction control system for electric multiple units is a reinforced high-strength case. Case panels on two sides of the reinforced case are reinforced panels. Compared with a traditional standard case, the reinforced case has better stability, anti-shock and anti-impact performance.

Figure 12:
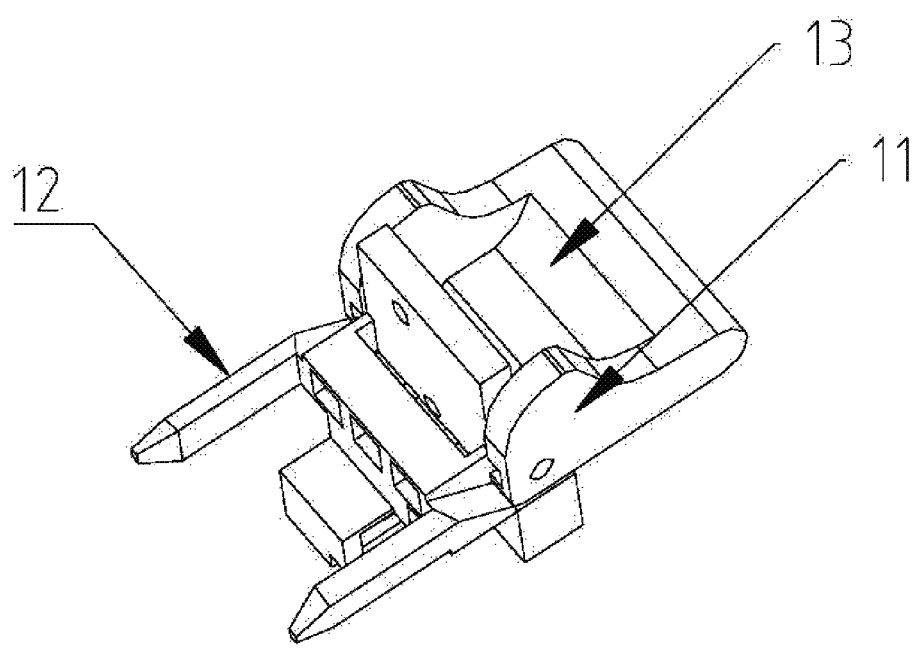
FIG. 12 is a schematic structure diagram of a double plug-in unit.

Double plug-in units are provided at the junctions between boards of the traction control system for electric multiple units and a main case board slot. Structure of one double plug-in unit is shown in FIG. 12.

The double plug-in unit mainly consist of a base plate 11, pins 12 and a switching board 13; an upper portion of the base plate 11 is connected to the switching board 13; the switching board 13 is an L-shaped board, and a bottom left portion of the L-shaped board is hinged with the base plate 11 at a hinge portion and can rotate by a certain angle along the hinge portion. A positioning groove for the switching board 13 is provided on the base plate 11, and the positioning groove is matched with a lower portion of the L-shaped board. Two rows of pins 12 are fixed at a lower portion of the base plate 11, and the pins 12 are used to connect the board slot. A bolt hole fixed with the board is provided on one side of the base plate 11. When the switching board rotates along the hinge portion to the positioning groove and becomes matched with it, a bottom portion of the switching board 13 is resisted against the upper portion of the board slot, and the board is pulled out.

The above network board receives digital signals and analog signals from the I/O module via a CAN bus, and performs information interaction with the host processor by a CPCI bus. Since an MVB network card is installed on the network board of the traction control system for electric multiple units, communication between the MVB board and the network board is realized by an ISA bus, while the network board is connected to the host processor by a Compact PCI and bidirectional communication between the two is realized by the CPCI bus. In order to solve the problem of failed direct communication between a CPCI bus on a CPU and an ISA bus on an MVB device, a protocol converter between a CPCI bus and an ISA bus is designed.

The protocol converter mainly consists of four modules, respectively: a CPCI local bus interface extension timing module, an ISA bus interface timing module, a CPCI bus matching ISA bus timing interface module, and a clock management module.

Figure 13:
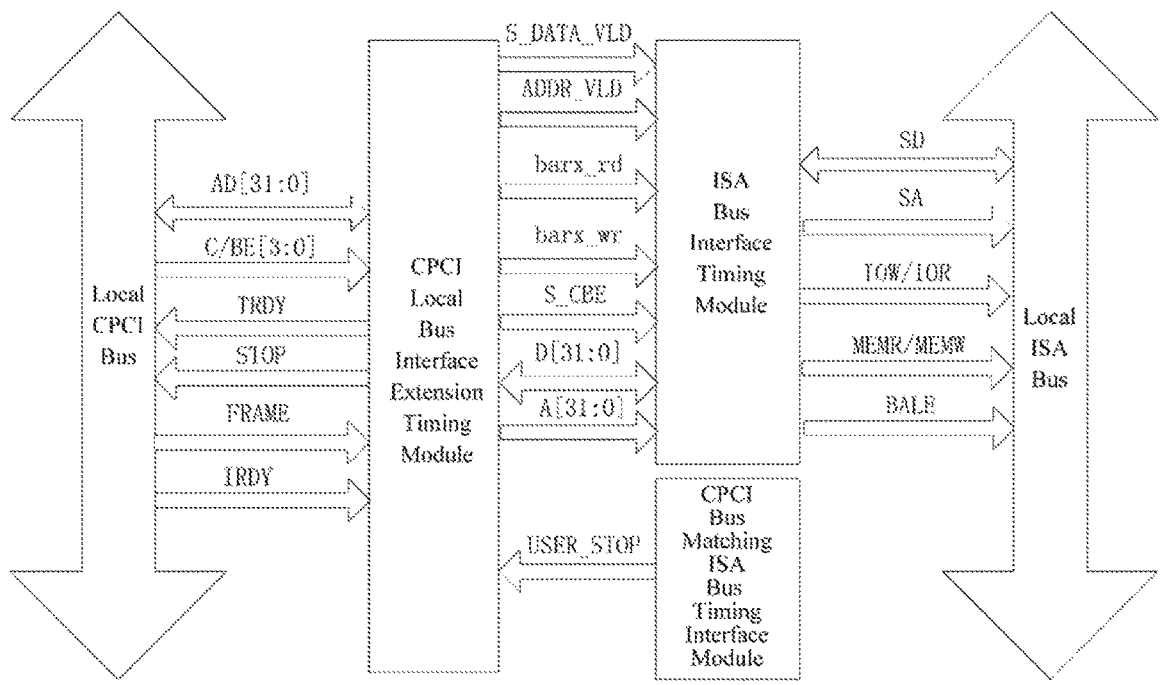
FIG. 13 is a schematic structure diagram of the protocol converter.

The CPCI local bus interface extension timing module is mainly used to configure an access space IO/MEMORY of the CPCI bus, control the read/write access of the CPCI bus, decode addresses and decode commands. An interface connection between the local CPCI bus and the CPCI local bus interface extension timing module is as shown in FIG. 13. Main signals between the two include: an address/data signal AD [31:0], a command/byte enable signal C/BE [3:0], a slave device get-ready signal TRDY, a data transfer stop signal STOP, a frame period signal FRAME, and a master device get-ready signal IRDY.

Figure 14:
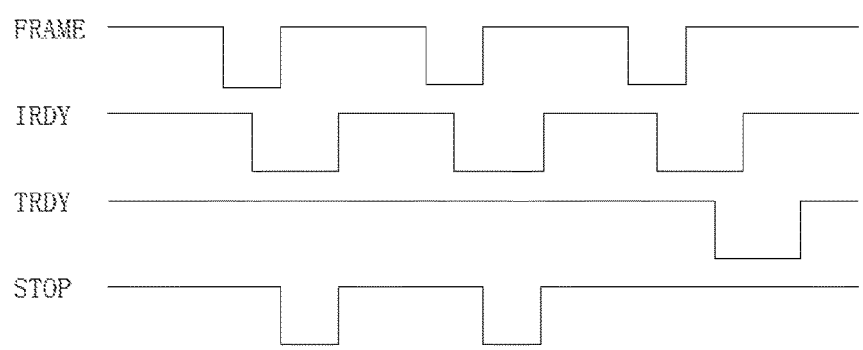
FIG. 14 is a specific timing chart of TRDY, STOP, FRAME, and IRDY.

For the data transfer stop signal STOP, since the CPCI bus is a high-speed device while the ISA bus is a low-speed device, and the CPCI bus is quick in read/write operation so that the MVB device which is in direct communication with the CPCI bus can hardly make a response, high data packet loss is caused. When the CPCI bus accesses in the form of IO, a waiting signal S_WAIT is inserted in the read/write operation of the CPCI bus to control the slave device get-ready signal TRDY of the CPCI bus. When the CPCI bus accesses in the form of MEMORY, the data transfer stop signal STOP is inserted in the read/write operation of the CPCI bus; before the present operation of the MEMORY device ends, the CPCI bus is in the interruption and reconnection state all the time, so that the CPCI bus requests for the present read/write operation all the time; and the CPCI bus will initiate a next read/write access until no data transfer stop signal STOP is inserted in the previous operation. The data transfer stop signal STOP is sent by the slave device; when the data transfer stop signal STOP is valid, it is indicated that the slave device requests the master device to terminate the present data transfer. FIG. 14 is a specific timing diagram of the slave device get-ready signal TRDY, the data transfer stop signal STOP, the frame period signal FRAME and the master device get-ready signal IRDY.

An interface connection between the CPCI local bus interface extension timing module and the ISA bus interface timing module is as shown in FIG. 13. Main signals between the two include: a data enable signal S_DATA_VLD, an address enable signal ADDR_VLD, a read enable signal barx_rd, a write enable signal barx_wr, a byte enable signal S_CBE, a data signal D [31:0] and an address signal A [31:0].

An operating command from the CPCI bus is recognized by an IP CORE module from XILINX company to generate a read/write enable signal S_WRDN, an address enable signal ADDR_VLD, a data enable signal S_DATA_VLD, a byte enable signal S_CBE and a space decoding signal BASE_HIT.

For the data enable signal S_DATA-VLD, since the CPCI bus and the ISA bus are inconsistent in read/write speed, an intermediate data buffering region BUFFER is to be established. That is, when a write operation of the CPCI bus is going to happen, the CPCI bus data is written into the data buffering region BUFFER and then transferred to the ISA bus; and when a read operation of the CPCI bus is going to happen, the ISA bus data is transferred to the data buffering region BUFFER and then transferred to the CPCI bus.

The read enable signal barx_rd and the write enable signal barx_wr are obtained in the following way: in the present traction controllers, the MVB device, based on ISA buses, can be an IO device or an MEMORY device or both, because the operating ways of ISA buses supported by MVB devices from different manufactures are different, the access space of the CPCI bus should be configured according to actual requirements; then, a chip selection signal of an MVB device is determined according to the address signal and an address enable signal ADDR_VLD provided by the CPCI bus; then, the space IO/MEMORY of the present operation is determined by further considering the read/write enable signal S_WRDN and the space decoding signal BASE_HIT; and eventually, a read enable signal barx_rd and a write enable signal barx_wr actually used are obtained. Wherein, x in the read enable signal barx_rd represents a selected space, x=0, 1 or 2; and x in the write enable signal barx_wr represents a selected space, x=0, 1 or 2.

An interface connection between the CPCI bus matching ISA bus timing interface module and the CPCI local bus interface extension timing module is as shown in FIG. 13. A main signal between the two is the interruption and reconnection signal USER_STOP which is mainly used to interrupt the data transfer stop signal STOP. The CPCI bus device initiates an access to the ISA bus device, and when accessing in the form of MEMORY, the CPCI bus matching ISA bus timing interface module sends an interruption and reconnection signal USER_STOP in real time to interrupt the data transfer stop signal STOP, in order to leave enough time for the ISA bus device to complete this read/write access. Thus, the problem that the CPCI bus and the ISA bus are inconsistent in read/write operation speed is solved.

An interface connection between the ISA bus interface timing module and the local ISA bus is as shown in FIG. 13. Main signals between the two include: a data signal SD, an address signal SA, a read/write IO device signal IOW/IOR, a read/write MEMMORY device signal MEMR/MEMW, and an address latch signal BALE.

Figure 15:
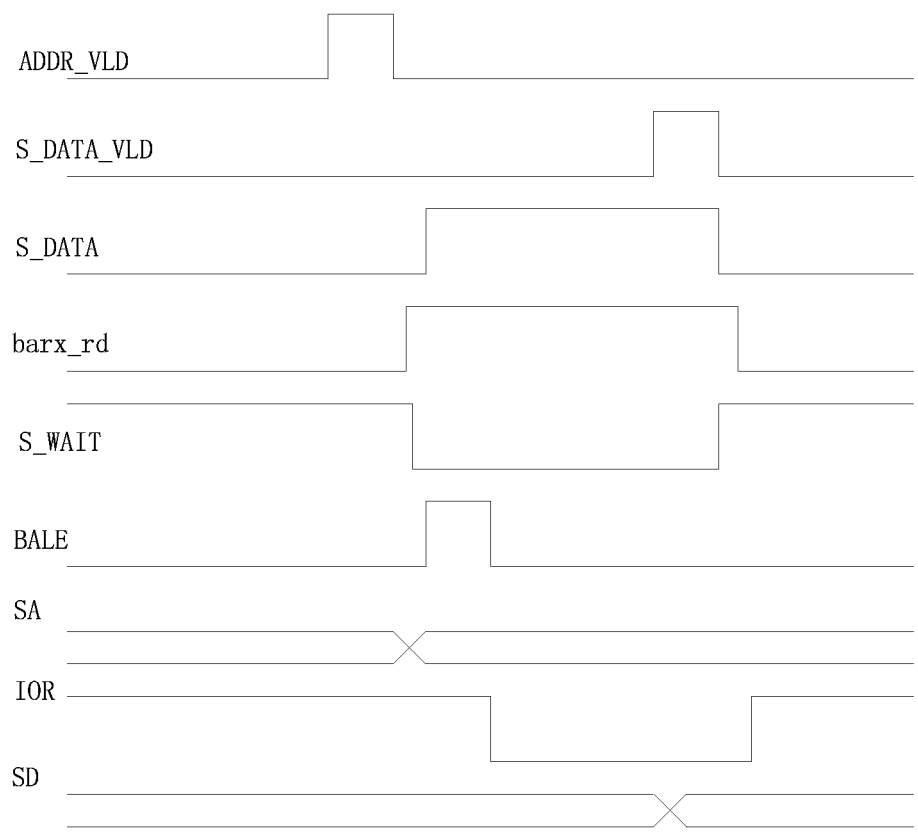
FIG. 15 is a partial timing chart of a read access in the form of IO by the protocol converter.

The clock management module provides an operation clock for the CPCI local interface extension timing module, the ISA bus interface timing module and the CPCI bus matching ISA bus timing interface module by an FPGA interior clock network and a phase-locked loop. FIG. 15 is partial timing chart of a read access in the form of IO by the protocol converter.

Figure 16:
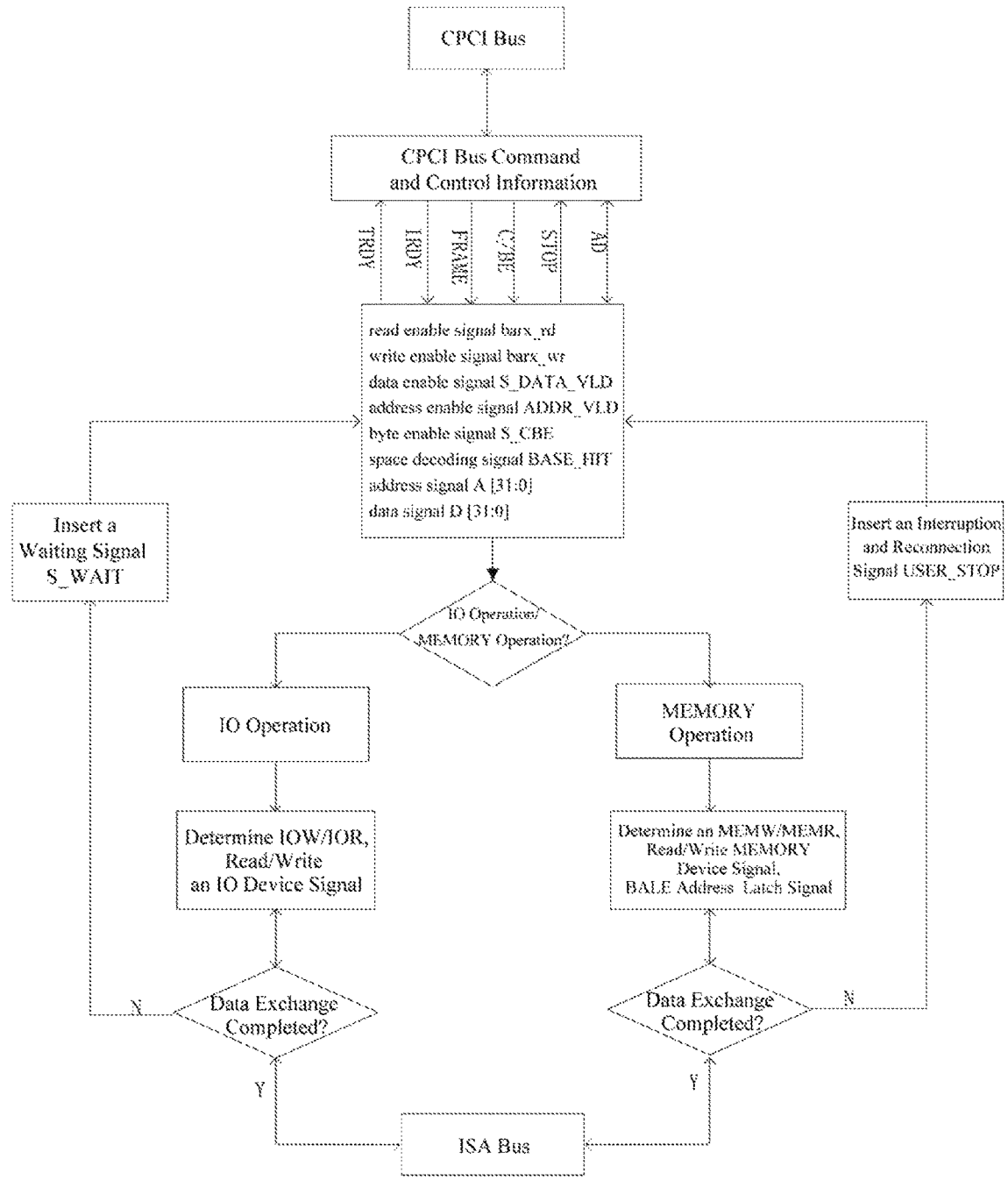
FIG. 16 is a flowchart of an access by the protocol converter.

FIG. 16 is a flowchart of an access by the protocol converter. The main control CPU device accesses to the MVB device with the ISA bus interface via the CPCI bus as follows:

1) an access space IO/MEMORY of the CPCI bus is determined, the data transfer stop signal STOP is inserted when the CPCI bus accesses in the form of MEMORY, and the waiting signal S_WAIT is inserted to wait for an ISA bus device to get ready when the CPCI bus accesses in the form of IO;

2) an actual address signal SA and an access mode for the CPCI bus to access to the ISA bus are determined by the address enable signal ADDR_VLD, the read enable signal barx_rd, the write enable signal barx_wr and the byte enable signal S_CBE, the access mode comprises the write operation and the read operation;

3) an address latch signal BALE of the ISA bus is determined;

4) byte data enabled in the 32-bit data is decided according to the byte enable signal S_CBE; and corresponding 8-bit data or 16-bit data is screened out from the intermediate data buffering region BUFFER for data interaction with an MVB device;

5) the read/write IO device signal IOW/IOR or the read/write MEMORY device signal MEMR/MEMW is determined according to the read/write signal pulse width specified by the ISA bus, and thus a main control CPU device accesses to the MVB device with the ISA bus interface by the CPCI bus in real time.

The traction control system for electric multiple units is a key component of the traction converter, mainly used for the traction converter to realize all the I/O control, acquisition of analog signals and pulse signals, convertor control, four-quadrant control, pulse interface control, network communication control, logic scheduling control and the like. The control software for functional modules or boards of the traction control system for electric multiple units is relatively independent. In addition, there are strict signal interface definitions between modules or boards. Data interaction is performed by a standard bus to ensure the timeliness and effectiveness of data.

Figure 17:
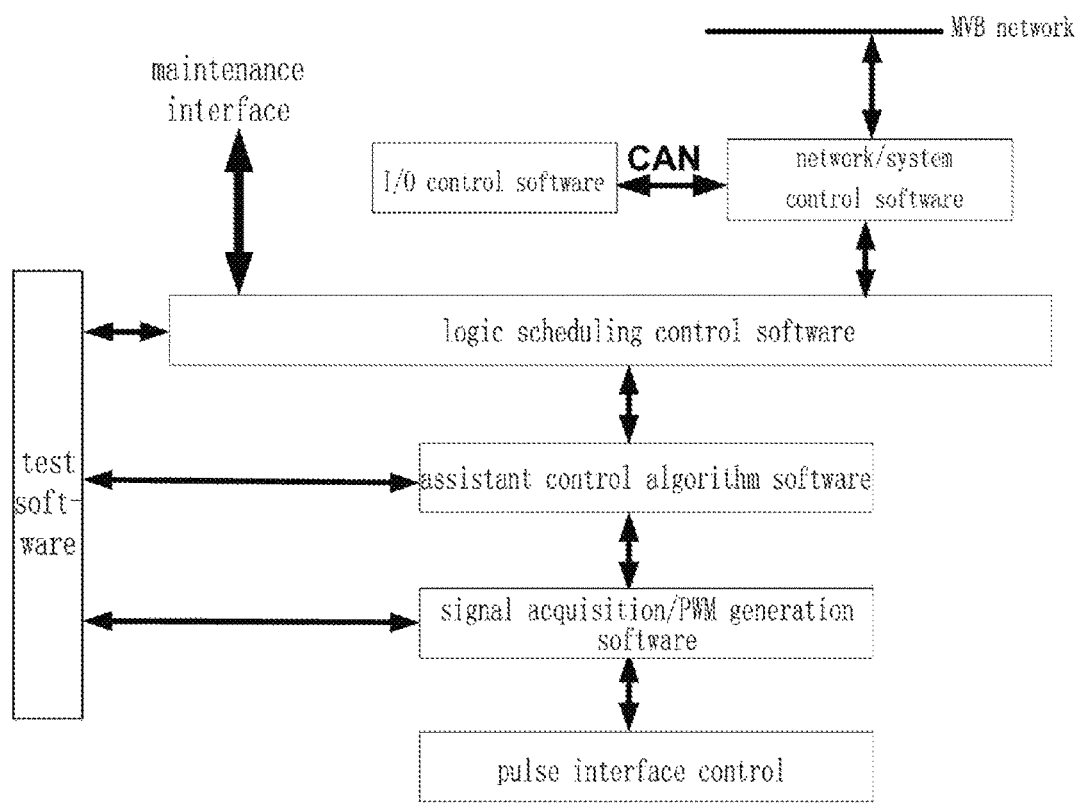
FIG. 17 is a software architecture of the traction control system for electric multiple units.

A software architecture of the traction control system for electric multiple units is shown in FIG. 17. Self-detection of logic scheduling software, converter control software, four-quadrant control software, signal acquisition/PWM generation software, pulse interface control software is completed by test software. Communication between the MVB network and the logic scheduling control software is completed by network communication control software. Communication between the four-quadrant pulse interface board, the four-quadrant signal sampling board and the four-quadrant fast computing board and communication between those boards and other modules are completed by the four-quadrant control software. Communication between the inverter impulse interface board, the inverter signal sampling board, and the inverter fast computing board and communication between those boards and other modules are completed by the inverter control software.

Figure 18:
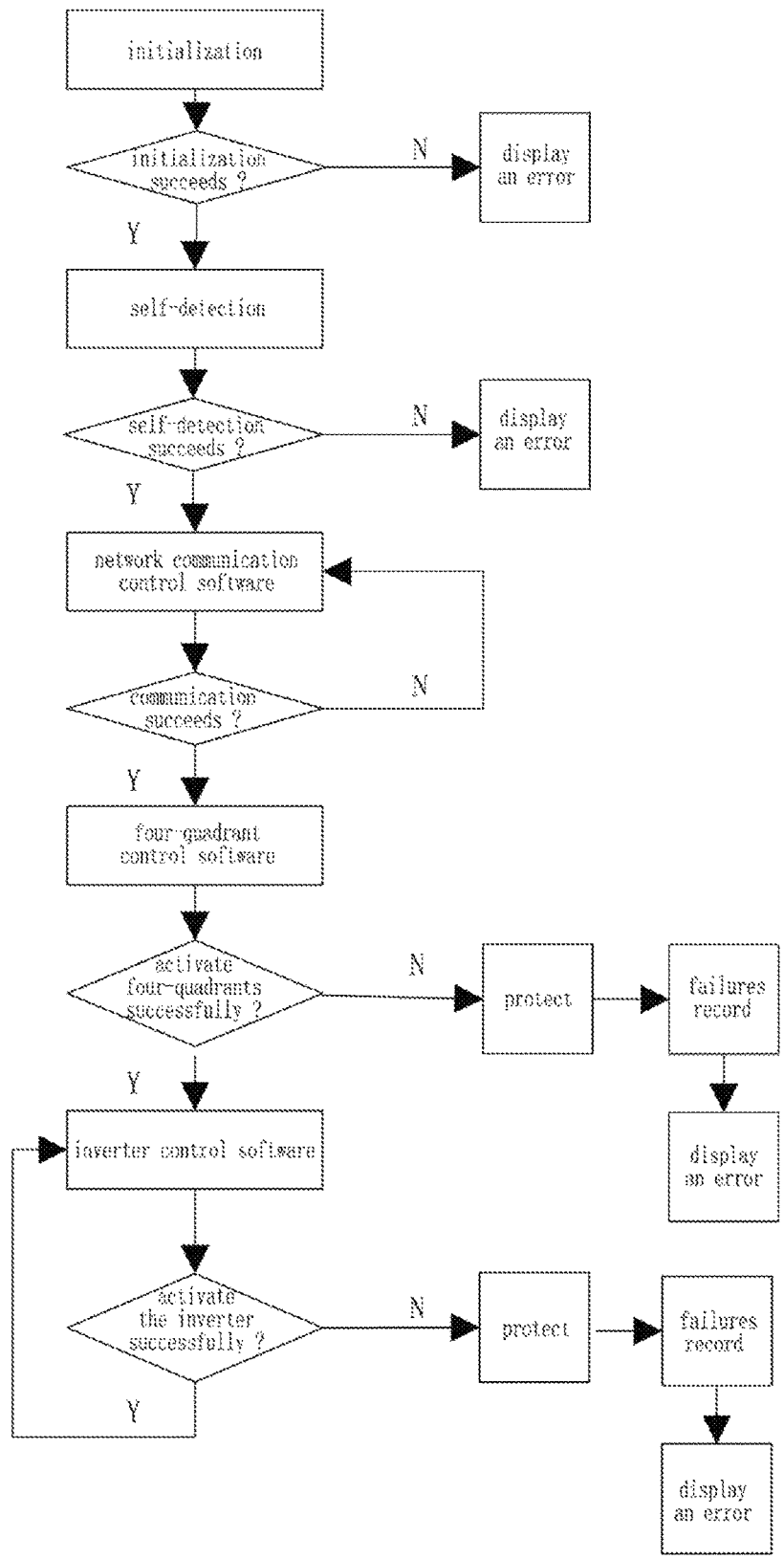
FIG. 18 is a flowchart of the traction control system for electric multiple units.

The operation flow of the traction control system for electric multiple units is shown in FIG. 18:

1) initializing the traction control system for electric multiple units;
2) detecting whether the system initialization succeeds or not, if the system initialization fails, displaying an error; and if the system initialization succeeds, activating a system self-detection procedure;
3) detecting whether the system self-detection succeeds or not, if the system self-detection fails, displaying an error; and if the system self-detection succeeds, activating the network communication control software;
4) detecting whether the network communication succeeds or not, if the network communication fails, returning to the step 3); and if the network communication succeeds, activating the four-quadrant control software;
5) detecting whether the four-quadrant control procedure is activated or not, if the four-quadrant control procedure fails to be activated, activating a four-quadrant protection procedure, recording the failure and displaying an error; and if the four-quadrant control procedure is activated successfully, activating an inverter control procedure; and
6) detecting whether the inverter control procedure is activated or not, if the inverter control procedure fails to be activated, activating an inverter protection procedure, recording the failure and displaying an error; and if the inverter control procedure is activated successfully, returning to the step 5).

In conclusion, the traction control system for electric multiple units can achieve the following functions:

1) controlling two groups of traction converters;
2) controlling two groups of four quadrants;
3) achieving logic control and protection control;
4) realizing communication with the train network system MVB;
5) realizing an electrically-controlled braking coordination with a train brake system;
6) realizing electric traction and motor braking;
7) realizing passing phase control;
8) realizing anti-idling control; and
9) recording failures, diagnosing and maintaining.

With regard to the present application, the currently mainstream control chips and advanced system architectures are adopted, meeting requirements on functions of the traction control system by the electric multiple units and high-speed trains. The host processor of the present application is a mainstream Intel Atom processor with a dominant frequency up to 1.3 GHz to 1.6 GHz; and the control algorithm processor is ADI TS203S, with a dominant frequency of 250 MHz. The mainstream processor chips are selected, and thus the system performance can be greatly enhanced. By mature application of the CPCI/CAN bus technologies, the embedded real-time operating system (QNX) and the DSP technologies, on the basis of introduction of advanced design concepts (self-testing, self-diagnosis, real-time self-detection and the like) of electric multiple units, by summarizing experience and lessons from practical application of electrical systems of electric multiple units and effectively applying to the design of hardware and software, a high-grade software and hardware platform for the traction control system for electric multiple units is developed by completely independent design effort. The platform has been assessed in the network, traction and assistance systems of electric multiple units, as well as in urban rails and subways and other products, and has been proved to meet an advanced level both in China and abroad.

It can be understood by those skilled in the art that the drawings are merely schematic views of one preferred embodiment, and the operation flows in the drawing are not totally necessary to the implement the present application.

Finally, it should be noted that, the foregoing embodiments are merely used for describing technical solutions of the present application, but not intended to limit the present application. Although the present application has been described in detail with reference to the foregoing embodiments, it should be understood by a person of ordinary skill in the art that, modifications can be made to the technical solutions recorded in the foregoing embodiments, or equivalent replacements can be made to some of the technical features. However, these modifications or replacements shall not render the essence of corresponding technical solutions departing from the scope of the technical solutions of the embodiments.

The invention claimed is:

1. A traction control system for electric multiple units, provided to control the operation of inverter power module and four-quadrant power module of a traction converter for electric multiple units, mainly comprising a power supply module, inverter/four-quadrant modules, an I/O module, a network module and a debugging module, wherein, the inverter/four-quadrant modules each mainly consist of a fast computing board, a signal sampling board and a pulse interface board, the signal sampling board is mainly configured to receive signals from an external sensor, receive pulse feedback signals sent by the pulse interface board and receive control signals sent by the fast computing board, and send pulse signals to the pulse interface board, send processed acquisition signals to the fast computing board, and send relay control signals to the I/O module;

the fast computing board is mainly configured to receive analog signals and digital signals acquired and processed by the signal sampling board and receive control signals sent by a host processor, and send control signals to the signal sampling board and send processing signals to the network module;

the pulse interface board can be connected to two groups of inverter power modules and two groups of four-quadrant power modules at most;

the pulse interface board is mainly configured to receive IGBT status signals sent by the inverter power module and four-quadrant power module and receive IGBT control signals sent by the signal sampling board, and send the IGBT status signals to the signal sampling board and send the IGBT control signals to the inverter power module and four-quadrant power module;

bidirectional communication between the signal sampling board and the fast computing board is realized by a high-speed differential LinkPort bus;

bidirectional communication between the signal sampling board and the I/O module is realized by a high-speed bus;

bidirectional communication between the fast computing board and the host processor, between the network module and the host processor, and between the debugging module and the host processor are realized by a CPCI bus;

bidirectional communication between the I/O module and the inverter/four-quadrant modules is realized by a high-speed bus;

bidirectional communication between the I/O module and the network module, between the I/O module and the debugging module are realized by a CAN bus;

the network module comprises a network board, and the network module receives digital signals and analog signals sent by the I/O module and transfers the digital signals and the analog signals to the host processor via the CPCI bus; receives command signals from the host processor via the CPCI bus, and sends commands to the I/O module to control the I/O module to output analog signals and analog signals; controls data interaction between an MVB interface unit and an external MVB bus; and sends MVB data to the host processor via the CPCI bus, and sends data to be sent by the host processor to the MVB interface unit via the CPCI bus;

the debugging module comprises a debugging board; the debugging module receives debugging commands and debugging signals sent by the host processor via the CPCI bus; the debugging module receives debugging signals sent by the signal sampling board via a high-speed bus; and, the power supply module supplies power to the inverter/four-quadrant modules, the I/O module, the network module and the debugging module.

2. The traction control system for electric multiple units according to claim 1, wherein the signal sampling board comprises a current/voltage acquisition unit and a clock management unit; and the current/voltage acquisition unit consists of a signal conditioning circuit and an ADC sampling circuit which is connected to the signal conditioning circuit; and the current/voltage acquisition unit has multiple paths, all of which are connected to the signal sampling board; the signal conditioning circuit comprises a first resistor, a second resistor, a filter capacitor and an operational amplifier; an input terminal of the signal conditioning circuit is connected to a sampling sensor terminal; the input terminal of the signal conditioning circuit is connected to a first terminal of the first resistor; a second terminal of the first resistor is connected to a first terminal of the second resistor and a positive input terminal of the operational amplifier, respectively; a second terminal of the second resistor is grounded; a reverse input terminal of the operational amplifier is connected to a reference voltage terminal; an output terminal of the operational amplifier is connected to the ADC sampling circuit; and the input terminal of the signal conditioning circuit is grounded via the filter capacitor.

3. The traction control system for electric multiple units according to claim 1, the pulse interface board comprises a PWM level conversion circuit, an optical-to-electric conversion unit, an electric-to-optical conversion unit, and a backplane interface unit; the PWM level conversion circuit is connected to the signal sampling board by the backplane interface unit; and the pulse interface board further comprise a self-diagnosis unit;

the self-diagnosis unit comprises an input diagnosis unit and an output diagnosis unit;

the optical-to-electric conversion unit comprises a multiplexer, buffers and an optical-to-electric conversion circuit, the backplane interface unit is connected to the multiplexer by a buffer D1, and the multiplexer is connected to the optical-to-electric conversion circuit by a buffer D2; and the electric-to-optical conversion unit comprises a multiplexer, buffers, and an electric-to-optical conversion circuit, the electric-to-optical conversion circuit is connected to the multiplexer by a buffer D3, and the multiplexer is connected to the backplane interface unit by a buffer D4; and the output diagnosis unit comprises a multiplexer and an output self-diagnosis circuit, output terminals of the buffers D2 of each group of optical-to-electric conversion units are connected to an input terminal of the multiplexer of the output self-diagnosis unit, an input terminal of the output self-diagnosis circuit is connected to an output terminal of the buffer D2, and an output terminal of the multiplexer is connected to the backplane interface unit; and the input diagnosis unit comprises a multiplexer and an input self-diagnosis circuit, an input terminal of the multiplexer is connected to the backplane interface unit, and an output terminal of the multiplexer is divided into multiple paths which are connected to the input terminals of the buffers D3 of each group of electric-to-optical conversion units, respectively.

4. The traction control system for electric multiple units according to claim 1, bidirectional communication between the network module and the host processor is realized by a protocol convertor of a CPCI bus and an ISA bus; the protocol converter comprises a CPCI local bus interface extension timing module, an ISA bus interface timing module, a CPCI bus matching ISA bus timing interface module, and a clock management module; and, the CPCI local bus interface extension timing module communicates with the local CPCI bus by an address/data signal AD31~AD0, a command/byte enable signal C/BE3~C/B 0, a slave device get-ready signal TRDY, a data transfer stop signal STOP, a frame period signal FRAME and a master device get-ready signal IRDY;

the ISA bus interface timing module communicates with the CPCI local bus interface extension timing module by a data enable signal S_DATA_VLD, an address enable signal ADDR_VLD, a read enable signal barx_rd, a write enable signal barx_wr, a byte enable signal S_CBE, a data signal D31~D0 and an address signal A31~A0;

the ISA bus interface timing module communicates with the local ISA bus by a data signal SD, an address signal SA, a read/write IO device signal IOW/IOR, a read/write MEMORY device signal MEMR/MEMW, an address latch signal BALE;

the CPCI bus matching ISA bus timing interface module communicates with the CPCI local bus interface extension timing module by an interruption and reconnection signal USER_STOP; and, the clock management module provides an operation clock for the CPCI local bus interface extension timing module, the ISA bus interface timing module and the CPCI bus matching ISA bus timing interface module.

5. The traction control system for electric multiple units according to claim 1, the I/O module mainly comprises a digital input board, a digital output board, and an analog input/output board.

6. The traction control system for electric multiple units according to claim 1, a main case of the traction control system for electric multiple units is a reinforced high-strength case, and case panels on two sides of the reinforced case are reinforced panels.

7. The traction control system for electric multiple units according to claim 1, double plug-in units are provided at the junctions between boards of the traction control system for electric multiple units and a main case board slot; the double plug-in units each mainly consist of a base plate, pins and a switching board; an upper portion of the base plate is connected to the switching board; the switching board is an L-shaped board, and a bottom left portion of the L-shaped board is hinged with the base plate at a hinge portion and can rotate by a certain angle along the hinge portion; a positioning groove for the switching board is provided on the base plate, and the positioning groove is matched with a lower portion of the L-shaped board; two rows of pins are fixed at a lower portion of the base plate, and the pins are used to connect the board slot; and a bolt hole fixed with the board is provided on one side of the base plate.

* * * * *